July 5, 1932.  R. REGELSON  1,865,960
PLANT BOX
Filed Feb. 7, 1930
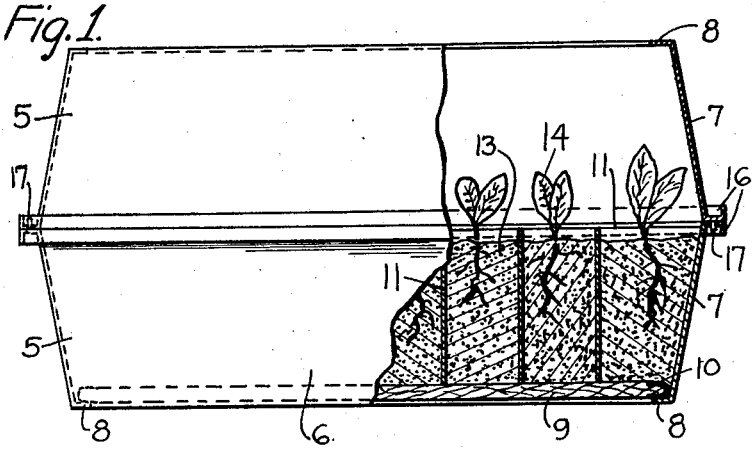
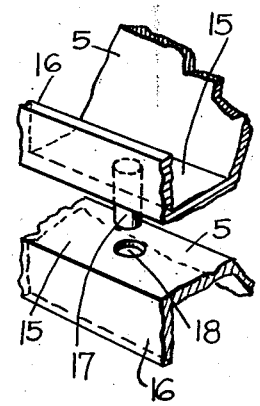
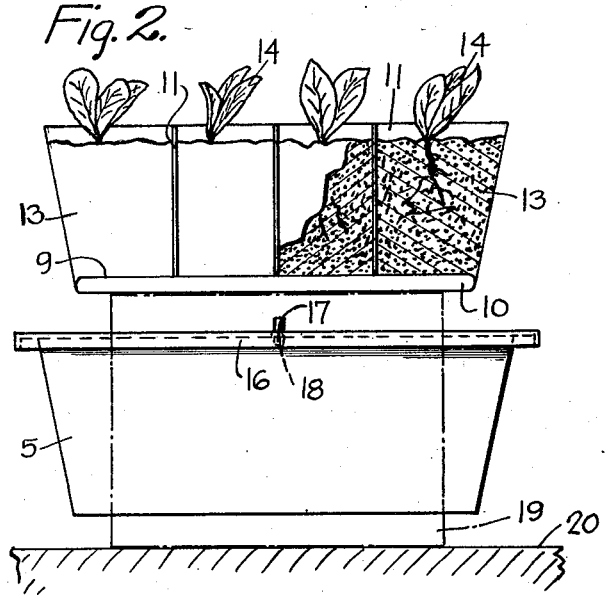
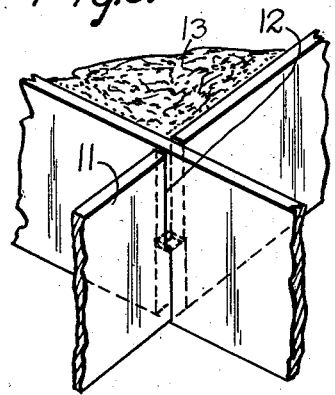
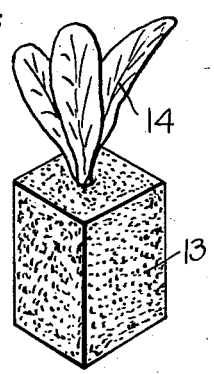
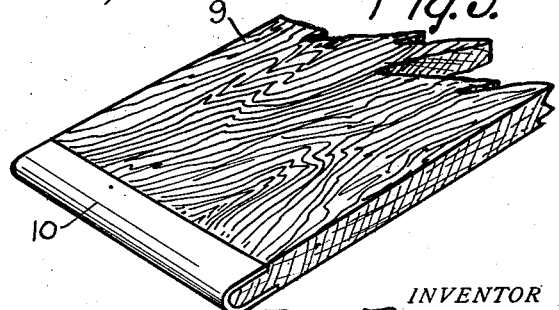
INVENTOR
RUBIN REGELSON
BY
John J. Lynch
ATTORNEY Patented July 5, 1932

1,865,960

UNITED STATES PATENT OFFICE

RUBIN REGELSON, OF NEW YORK, N. Y.

PLANT BOX

Application filed February 7, 1930. Serial No. 426,592.

This invention relates to metal plant flats or seed boxes and used particularly in greenhouses in the transplanting of plants, seedlings or the like.

A particular object of my invention is to provide a double part plant flat or seed box, the parts of which are provided with sloping sides, and a movable bottom so that the seedlings may be moved about from place to place during transplanting operations in large quantities and without damage.

A particular object of my invention is to provide a plant flat or seed box in which the removable bottom is provided with metallic end binding to prevent warpage and to prevent the wood from cracking or splitting or when it has become cracked by accident to prevent the parts from falling out and damaging the seedlings.

A still further object of my invention is to provide a plurality of seed boxes which are identical in construction, any one of which when in inverted position over the other, provides a protective housing during transportation, and with a piece of glass placed thereon, makes an ideal starting box for seeds or cuttings.

In connection with the removable bottom of the seed box, it is proposed to use a series of cardboard partitions of interlocking type for the purpose of dividing each bottom into a plurality of sections in which the plants are disposed.

With the foregoing and other objects in view, which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawing:—

Figure 1 is a view in side elevation of a metal plant flat or seed box constructed in accordance with my invention, a part thereof being shown in cross section to illustrate the construction.

Figure 2 is a view in side elevation showing how the removable bottom is raised out of the holding box in a transplanting operation, the cardboard partitions being also illustrated in this view.

Figure 3 is a fragmentary view in perspective showing one end of the bottom board which is used to hold the plants.

Figure 4 is a view in perspective of a plant or seedling as it is held on the bottom board by the partitions which provide for each plant an individual rectangular block of earth or planting material.

Figure 5 is a view in perspective of a fragmentary portion of a longitudinal and transverse cardboard partition employed in connection with my removable bottom to divide the same into plant holding sections, and Figure 6 is a view in perspective of a fragmentary portion of one end of two of the planting boxes showing the locating pin and opening through the medium of which two boxes may be used together in proper register.

Referring to the drawing in detail, 5 indicates a metallic box forming a part of the metal plant flat as it is known in the trade and constructed of galvanized iron of any gauge or any metal of a non-corrodible nature. This box 5 is used with another similar box 5, which latter box acts as a protective covering for seedlings in transit.

As illustrated in Figure 1, the box consists of the side and end walls 6 and 7 respectively and a flanged bottom edge portion 8, the flange being turned inwardly at all four sides of the receptacle to support at its edges, a removable bottom 9. This removable bottom is preferably constructed of wood so that it will not rust nor corrode and at its opposite ends, it is reinforced by the heavy metallic binding 10 which is preferably of a non-rusting metal.

In originally planting the seedlings, a plurality of longitudinal and transverse interlocking cardboard strips 11 will be employed, each provided with the suitable cutout 12 to receive the transversely extending interlocking strips, this particular construction being old and in itself, not forming a part of my invention only in so far as it is used in connection with the seed box. When these partitions have been laid in place upon the bottom 9, they provide individual compartments in which the earth or planting material 13 is placed together with the seedlings or young plants 14.

Any number of transverse and longitudinal extending partitions may be employed and while I have mentioned cardboard, it is understood that they may be made of any suitable non-corroding material and may be in such arrangement that any number of compartments may be formed and these compartments may vary in size, depending upon the nature of the seedlings or the work to be done.

The plant box 5 at its side and end top edges is provided with an outwardly extending flange 15 whose outer peripheral edge is turned down as at 16 for the purpose of adding strength to the flange 15 and also for convenience in handling the boxes.

It will be noted from inspection of Figure 1 that the top of the box 5 is of greater area than the bottom or in other words, the sides of the box are sloped so that the bottom 9 may be readily removed and with it, the seedlings without danger of damage to the latter.

At the ends of the boxes 5, one of the flanges may be provided with a dowel or guide pin 17, while in the other box, the flange at the same point may be provided with suitable dowel pin or guide pin openings 18 so that, as illustrated in Figure 1, two of the boxes may be placed together to protect the seedlings in transit and when desired, the bottom flange 8 of the upper box would provide a support for a piece of glass to provide an ideal starting box for seeds or cuttings. As indicated by the dot and dash lines 19 in Figure 2, a block or other object may be mounted upon a supporting surface 20, which block may pass through the bottom of the box 5 so that the box may be dropped away from the bottom 9, which facilitates transplanting and other similar greenhouse operations.

It is evident, therefore, that with my particular plant flat or seed box that through the medium of the cardboard partitions in connection with a removable bottom edge, the seedlings 14 remain intact with all the roots in each of their individual compartments and a number of these seedlings may be handled quickly and efficiently without detrimental effect.

It is evident also that I have provided a metal plant flat or seed box having sloping sides and interlocking devices on the rims thereof together with a movable bottom and cardboard partitions, all of which are improvements on the wooden plant flat now in use.

If desired, the bottom member may be made of mesh wire to provide a sieve for use in cleaning small quantities of seeds or soil.

While I have illustrated and described my invention with some degree of particularity, I realize that in practice various alterations therein may be made without departing from the spirit of the invention or the scope of the appended claims.

What I claim is:—

1. A plant box comprising a receptacle having an open top and bottom, a relatively narrow edge flange bounding said bottom opening, a removable bottom supported by said flange, a flange about the upper edge of the receptacle having a pin opening therein at one side of the receptacle, and a pin on the flange at the opposite side of the receptacle from said opening.

2. A plant box comprising a receptacle having an open top and bottom, a relatively narrow edge flange bounding said bottom opening, a removable bottom supported by said flange, a reinforce edge binding on said bottom, a flange about the upper edge of the receptacle having a pin opening therein at one side of the receptacle, and a pin on the flange at the opposite side of the receptacle from said opening.

3. A plant box comprising a receptacle having an open top and bottom, a relatively narrow edge flange bounding said bottom opening, a removable wooden bottom supported by said flange, a reinforce metallic edge binding on said wooden bottom, a flange about the upper edge of the receptacle having a pin opening therein at one side of the receptacle, and a pin on the flange at the opposite side of the receptacle from said opening.

In testimony whereof, I have signed my name to this specification this 4th day of February, 1930.

RUBIN REGELSON. [L. S.]